United States Patent [19]

Miyakawa et al.

[11] Patent Number: 5,415,906
[45] Date of Patent: May 16, 1995

[54] HEAT RESISTANT ELECTRICALLY CONDUCTIVE PLASTIC SHEET AND CONTAINER

[75] Inventors: Takeshi Miyakawa; Mikio Shimizu; Masami Inoue; Tadaaki Hirooka, all of Machida, Japan

[73] Assignee: Denki Kagaku Kogyo Kabushiki Kaisha, Tokyo, Japan

[21] Appl. No.: 245,656

[22] Filed: May 18, 1994

[51] Int. Cl.$^6$ ............... B32B 5/16; B32B 27/08; B65D 85/90

[52] U.S. Cl. ............... 428/35.7; 428/36.4; 428/411.1; 428/408; 206/328; 257/702

[58] Field of Search ............ 206/328; 257/702; 428/35.7, 36.4, 408, 411.1

[56] References Cited

U.S. PATENT DOCUMENTS 4,404,125  9/1983  Abolins et al. ............ 525/132
4,728,461  3/1988  Fujii et al. ............ 525/68
5,126,824  6/1992  Ueda ............ 257/702

*Primary Examiner*—Thomas Hamilton, III
*Attorney, Agent, or Firm*—Oblon, Spivak, McClelland, Maier & Neustadt

[57] ABSTRACT

A heat resistant electrically conductive plastic sheet comprising (1) a base material layer A made of a base material resin composition comprising from 32 to 94 wt % of a polyphenylene ether resin (hereinafter referred to simply as PPE), from 4 to 61 wt % of a high-impact polystyrene resin (hereinafter referred to simply as HI) and from 2 to 17 wt % of a polyolefin resin and (2) an electrically conductive layer B made of an electrically conductive resin composition comprising from 10 to 85 wt % of PPE, from 8 to 82 wt % of HI and from 3 to 33 wt % of an electrical conductivity-imparting material, integrally laminated on one side or both sides of the base material layer A by coextrusion.

14 Claims, No Drawings

HEAT RESISTANT ELECTRICALLY CONDUCTIVE PLASTIC SHEET AND CONTAINER

BACKGROUND OF THE INVENTION

1. Field of the Invention

The present invention relates to a heat resistant electrically conductive plastic sheet which comprises a base material layer A comprising three components of a polyphenylene ether resin (hereinafter referred to simply as PPE), a high-impact polystyrene resin (hereinafter referred to simply as HI) and a polyolefin resin (hereinafter referred to simply as PO) and an electrically conductive layer B comprising three components of PPE, HI and an electrical conductivity-imparting material, integrally laminated on one side or both sides of the base material layer A by coextrusion, and a packaging container for a semiconductor integrated circuit (hereinafter referred to simply as a heat resistant electrically conductive carrier tape) obtained by subjecting the sheet to embossing treatment.

2. Discussion of Background

As a packaging for IC or for parts of electronic equipments employing IC, a soft tray, an embossed carrier tape or the like has been known. The plastic sheet constituting the base material for such a soft tray or an embossed carrier tape usually has high surface resistivity, whereby it is easily electrifiable and is highly likely to impair the function of IC. To overcome this problem, there have been proposed (1) a method of coating an antistatic agent on the surface of the packaging container, (2) a method of coating an electrically conductive paint, and (3) a method of kneading an antistatic agent or carbon black into a usual resin.

On the other hand, as a resin has been used as an IC molding compound and moisture absorption of an IC mold has increased, many troubles such as crack of IC molding compound (generally called packaging crack) and corrosion of wiring have occurred frequently due to rapid moisture removal which takes place at the time of bonding IC to the surface of a circuit substrate. To prevent such troubles, it has been common to carry out predrying at a temperature of from 100° to 150° C. so-called baking, prior to bonding IC to the surface of a circuit substrate.

As a material for a packaging container for such baking, many heat resistant electrically conductive resin compositions have been proposed, and trays injection-molded from such resin compositions are practically used. However, such injection molded trays are not suitable for high speed mounting of IC, since movement of the mounting machine is obliged to be complicated. Further, if conventional heat resistant electrically conductive resin compositions are formed into sheets, there will be a problem such as inadequate strength or inadequate secondary moldability of the sheets. To overcome such problems, Japanese Examined Patent Publication No. 50391/1993 proposes a heat resistant electrically conductive composite plastic sheet having an electrically conductive resin layer laminated on a base material layer composed of a polyphenylene ether resin composition. However, by this method, if carbon black is incorporated to the polyphenylene ether resin, the melt viscosity increases substantially, and there will be a difference in fluidity between the base material resin and the electrically conductive resin during coextrusion, whereby defective lamination of the sheet is likely to result, and the sheet tends to be inadequate in the practical strength. Further, when such a sheet is formed into a carrier tape, the secondary moldability tends to be poor, and the resulting tape tends to be practically inadequate as a heat resistant electrically conductive carrier tape.

SUMMARY OF THE INVENTION

It is an object of the present invention to solve such problems and to provide a heat resistant electrically conductive plastic sheet which comprises a base material layer A made of a base material resin composition comprising three components of a polyphenylene ether resin (PPE), a high-impact polystyrene resin (HI) and a polyolefin resin (PO) and an electrically conductive layer B comprising three components of PPE, HI and an electrical conductivity-imparting material, integrally laminated on one side or both side of the base material layer A by coextrusion, and a heat resistant electrically conductive carrier tape which is prepared by embossing such a sheet by a method such as vacuum forming air pressure forming or hot plate forming and which has heat resistance, mechanical properties and electrical conductivity suitable for packaging IC or electronic parts.

Thus, the present invention provides a heat resistant electrically conductive plastic sheet comprising (1) a base material layer A made of a base material resin composition comprising from 32 to 94 wt % of a polyphenylene ether resin (PPE), from 4 to 61 wt % of a high-impact polystyrene resin (HI) and from 2 to 17 wt % of a polyolefin resin (PO) and (2) an electrically conductive layer B made of an electrically conductive resin composition comprising from 10 to 85 wt % of PPE, from 8 to 82 wt % of HI and from 3 to 33 wt % of an electrical conductivity-imparting material, integrally laminated on one side or both sides of the base material layer A by coextrusion.

The heat resistant conductive plastic sheet of the present invention preferably satisfies the condition represented by $a-40 \leq b \leq a-5$ where a is the content by weight % of PPE in the base material layer, and b is the content by weight % of PPE in the electrically conductive layer B on one side or both sides of the base material layer A.

Further, the base material layer A of the heat resistant electrically conductive plastic sheet of the present invention may preferably contain from 0.1 to 10 parts by weight of a filler per 100 parts by weight of the total amount of the three components of PPE, HI and PO.

DETAILED DESCRIPTION OF THE PREFERRED EMBODIMENTS

Now, the present invention will be described in detail.

Firstly, the base material layer A of the present invention will be described. The base material layer A comprises the three components of the polyphenylene ether resin (PPE), the high impact polystyrene resin (HI) and the polyolefin resin (PO) as the essential components in such proportions that PPE is from 32 to 94 wt %, HI is from 4 to 61 wt % and PO is from 2 to 17 wt %. The content of PPE is particularly preferably from 45 to 85 wt %. If the content of PPE is less than 32 parts by weight, no adequate mechanical properties and heat resistance tend to be obtainable. On the other hand, if it exceeds 94 parts by weight, pelletizing by a kneader and preparation of a sheet tend to be very difficult, and further secondary moldability of the sheet tends to be difficult.

The polyphenylene ether resin to be used in the present invention may be a homopolymer or a copolymer disclosed in U.S. Pat. No. 3,383,435.

As the high impact polystyrene resin, it is preferred to employ a high impact polystyrene resin containing from 2 to 10 wt % of a rubber component to enhance the impact resistance. Particularly preferred as such a high impact polystyrene resin, is a resin having styrene graft-copolymerized to butadiene rubber.

Further, in the present invention, the polyolefin resin is used to improve the secondary moldability and the mechanical properties such as impact resistance of the base material layer A. The polyolefin resin includes, for example, polyethylene copolymer resins. Among them, an ethylene-α-olefin copolymer resin and an ethylene-organic acid ester copolymer resin are preferred. The ethylene-α-olefin copolymer resin may, for example, be an ethylene-1-butene copolymer resin or a copolymer resin of ethylene with propylene, hexene and 1-butene. The ethylene-organic acid ester copolymer resin may, for example, be an ethylene-vinyl acetate copolymer resin or an ethylene-acrylic acid ester copolymer resin. Particularly preferred is an ethylene-ethyl acrylate copolymer resin. Most preferred is an ethylene-ethyl acrylate copolymer resin having an ethyl acrylate content of from 5 to 30 wt %. Further, as a polyethylene copolymer resin, a copolymer resin having styrene grafted to a polyolefin resin, or a resin obtained by hydrogenating a styrene-diene-styrene block copolymer resin, may be employed.

The polyolefin resin in the base material layer A is preferably from 2 to 17 wt %, more preferably from 3 to 15 wt %. If the content is less than 2 wt %, no adequate effect for improving the strength can be obtained. On the other hand, if the content exceeds 17 wt %, the compatibility tends to be poor, whereby interlayer peeling is likely to occur.

In order to improve the interlayer adhesion, a filler may further be incorporated to the base material layer and/or the electrically conductive layer, particularly preferably to the base material layer. The amount of the filler to be incorporated to the base material layer is usually from 0.1 to 10 parts by weight per 100 parts by weight of the total amount of the three components of PPE, HI and PO. If the amount of the filler is less than 0.1 part by weight, no adequate effect can be obtained, and if it exceeds 10 parts by weight, the mechanical properties and the embossing processability tend to deteriorate. As the filler, an inorganic filler such as calcium carbonate, talc, carbon black or mica may be used. However, carbon black is most preferred.

Further, various additives such as an antioxidant and a lubricant may be incorporated as processing assistants, as the case requires. It is further possible to incorporate scraps of the heat resistant electrically conductive composite plastic sheet of the present invention to the base material layer to such an extent not to impair the mechanical properties.

Now, the electrically conductive layer B will be described. The electrically conductive resin composition constituting the electrically conductive layer B of the present invention comprises three components of a polyphenylene ether resin (PPE), a high impact polystyrene resin (HI) and an electrical conductivity-imparting material in such proportions that PPE is from 10 to 85 wt %, HI is from 8 to 82 wt % and the electrical conductivity-imparting material is from 3 to 33 wt %. The content of PPE is most preferably from 25 to 75 wt %.

If the content of PPE is less than 10 wt %, no adequate mechanical properties or no adequate heat resistance tends to be obtained. On the other hand, if it exceeds 85 wt %, lamination of the electrically conductive layer with the base material layer by coextrusion will be difficult, and it will be difficult to form a sheet by an extruder.

In the present invention, the content (a wt %) of PPE in the base material layer A and the content (b wt %) of PPE in the electrically conductive layer B are preferably numbers which satisfy $a-40 \leq b \leq a-5$, whereby the melt flow of the compositions for the electrically conductive layer B and the base material layer A can readily be made equal, and an excellent electrically conductive plastic sheet can be obtained by coextrusion. When conductive layers B are laminated on both sides of the base material layer A, the compositions constituting the respective electrically conductive layers B may be the same or different within the above range.

The polyphenylene ether resin to be used for the electrically conductive layer B of the present invention may be the same as used for the above-mentioned base material layer A and may be a homopolymer or copolymer as disclosed in U.S. Pat. No. 3,383,435.

The high impact polystyrene resin to be used for the electrically conductive layer B may be the same as used for the above-mentioned base material layer A.

As the electrical conductivity-imparting material to be used for the electrically conductive layer B, various electrically conductive fillers such as carbon fibers, metal fibers, metal powders and carbon black, may be employed. However, it is preferred to use carbon black when the mechanical properties and the secondary moldability are taken into account.

The carbon black useful in the present invention includes furnace black, channel black and acethylene black, preferably the one having a carbon purity of at least 98% and a volatile content of at most 1.5%. If carbon black having a volatile content of more than 1.5% is used, foaming is likely to take place at the sheet surface during the extrusion processing.

The content of the electrical conductivity-imparting material is usually from 3 to 33 wt %. If the content is less than 3 wt %, no adequate electrical conductivity can be obtained. On the other hand, if it exceeds 33 wt %, the mechanical properties tend to deteriorate.

Further, it is possible to incorporate a polyolefin resin in addition to PPE, HI and the electrical conductivity-imparting material constituting the electrically conductive layer B in order to improve embossing processability and the mechanical properties such as impact resistance. The polyolefin resin may be the same as used for the above-mentioned base material layer A.

The amount of the polyolefin resin is preferably from 1 to 20 parts by weight, more preferably from 4 to 10 parts by weight, per 100 parts by weight of the total amount of the three components of PPE, HI and PO. If the amount is less than 1 part by weight, no adequate effect as a modifier can be obtained. On the other hand, if it exceeds 20 parts by weight, the heat resistance tends to deteriorate, and the effect as a reinforcing material will be low. Further, various additives such as an antioxidant and a lubricant may be incorporated to the resin composition for the electrically conductive layer as processing assistants, as the case requires.

For the production of a heat resistant electrically conductive plastic sheet of the present invention, a method may, for example, be employed wherein firstly starting materials for the base material layer A and the electrically conductive layer B are, respectively, kneaded by various kneading machines such as twin screw extruders or continuous kneaders to obtain pellets of the respective resin compositions, and then the resin compositions for the base material layer A and the electrically conductive layer B are, respectively, supplied to two or, if necessary, more than two extruders, and by using T-dies provided with a feed block or multimanifold dies, the electrically conductive layer is integrally laminated on one side or both sides of the base material layer by coextrusion.

Such a series of processing operations are conducted at a temperature within a range of from 250° to 320° C. If the temperature is lower than this range, no adequate molding can be conducted, and if it exceeds the temperature range, the resins are likely to decompose.

The overall thickness of the heat resistant electrically conductive plastic sheet obtained by the coextrusion molding of the present invention is preferably from 0.1 to 5.0 mm, more preferably from 0.2 to 2.0 mm.

If the thickness of the conductive sheet is less than 0.1 mm, the strength as a packaging container for IC, etc. will be inadequate, and if it exceeds 5.0 mm, non-uniformity in the thickness at the time of the secondary molding tends to be substantial and molding tends to be difficult.

The heat resistant electrically conductive plastic sheet of the present invention has the electrically conductive layer B laminated on one side or both sides of the base material layer A, wherein the proportion of the entire electrically conductive layer B to the overall thickness of the sheet is preferably from 2 to 70%, more preferably from 5 to 50%. If the thickness is less than 2%, processing by an extruder tends to be difficult, and if it exceeds 70%, the mechanical properties and embossing processability tend to deteriorate.

The thicknesses of the respective layers are preferably uniform, and the range of precision of the thickness of the electrically conductive layer to the overall thickness is preferably within ±10%. If the thicknesses are not uniform, it will be difficult to obtain good mechanical properties and embossing processability constantly.

To obtain a heat resistant electrically conductive carrier tape of the present invention (hereinafter referred to simply as a carrier tape) from the conductive sheet, embossing may be applied by a conventional method such as vacuum forming or air-pressure forming. The width of the sheet for such processing is usually preferably from 5 to 60 mm. If the width is less than 5 mm, no adequate tape strength durable for high speed mounting can be obtained, and if it exceeds 60 mm, handling at the time of mounting tends to be inferior.

The shape of embosses of the carrier tape of the present invention is determined depending upon the shape of the electronic parts to be packaged. However, with respect to the opening size of each emboss, the size in the machine direction is preferably less than the sheet width, and the size in the transverse direction is required to be smaller by at least 3 mm than the sheet width. If the opening size of the emboss is larger than the above, winding on a winding reel or use of a mounting machine tends to be difficult, and a dimensional change of the embossed portions due to shrinkage during the heating and drying treatment is likely to occur.

The wall and bottom thickness of the embossed portions after forming is preferably at least 0.05 mm, more preferably at least 0.07 mm. The surface resistivity of the carrier tape suitable for packaging electronic parts is preferably at most $10^{10}$ Ω. If the wall thickness of the sheet is less than 0.05 mm, the surface resistivity tends to exceed $10^{10}$ Ω, and if it is less than 0.07 mm, no adequate strength tends to be obtained at the embossed portions.

To conduct baking treatment of electronic parts such as IC by means of the carrier tape of the present invention, such electronic parts are accommodated into the embossed portions and covered with a cover tape, and then the carrier tape is wound on a reel and subjected to heat drying treatment at a temperature of at least above 100° C. Then, at the time of mounting the electronic parts such as IC, the cover tape is peeled from the carrier tape, and the parts are then taken out and mounted.

Now, the present invention will be described in further detail with reference to Examples.

EXAMPLE 1

For the base material layer A, a resin composition was used which was obtained by mixing 67 kg of a polyphenylene ether resin, 29 kg of a high impact polystyrene resin, 4 kg of an ethylene-ethyl acrylate copolymer as a polyolefin resin and further 1.2 kg of processing assistant A and 1.2 kg of processing assistant B, followed by kneading the mixture. For the electrically conductive layer B, a resin composition was used which was prepared by mixing 32 kg of a polyphenylene ether resin, 48 kg of a high impact polystyrene resin, 20 kg of carbon black as an electrical conductivity-imparting material, 7.4 kg of an ethylene-ethyl acrylate copolymer resin as a polyolefin resin and further 1.2 kg of each of processing assistants A and B and 1.8 kg of processing assistant C, followed by kneading the mixture. Then, the respective resin compositions were coextruded by a feed block method by means of three extruders (one extruder for the base material layer A and two extruders for electrically conductive layers B) to obtain a sheet having a three layer structure of conductive layer/base material layer/conductive layer with the overall thickness being 0.3 mm, the thickness of the base material layer being 85% of the overall thickness and the thickness of the electrically conductive layers being 15% of the overall thickness. This sheet was slit into tapes with a width of 24 mm, which were subjected to embossing treatment by vacuum forming to obtain carrier tapes with embosses having a length of 13 mm, a width of 19 mm and a depth of 3 mm. Table 1 shows the formulations of the resin compositions for the base material layer and the electrically conductive layer. Tables 2 and 3 show the results of measurement of the physical properties of the sheet and the physical properties of the carrier tapes.

EXAMPLE 2

The operation was carried out in the same manner as in Example 1 except that the high impact polystyrene resin for the base material layer A was changed to 25.6 kg, the modifier was changed to 7.4 kg, 2 kg of carbon black was used as a filler to prevent peeling and treating assistant C was used in an amount of 1.8 kg. The Table 1 shows the formulations of the resin compositions for the base material layer and the electrical conductive layer, and Tables 2 and 3 show the results of measurements of various physical properties.

EXAMPLE 3

The operation was carried out in the same manner as in Example 1 except that for each of the base material layer and the electrically conductive layer, as the polystyrene resin, a mixture of a high impact polystyrene resin and a transparent polystyrene resin in a ratio of 2:1, was used. The results of measurement of various physical properties are shown in Tables 2 and 3.

EXAMPLE 4

The operation was carried out in the same manner as in Example 1 except that the polyphenylene ether resin was changed to 58 kg for the base material layer and 40 kg for the electrically conductive layer, and the high impact polystyrene resin was changed to 38 kg and 40 kg, respectively. The results of measurement of various physical properties are shown in Tables 2 and 3.

COMPARATIVE EXAMPLE 1

The operation was carried out in the same manner as in Example 1 except that for each of the base material layer and the electrically conductive layer, the high impact polystyrene resin was changed to a transparent polystyrene resin. The product was inferior in the impact strength as compared with the preceding Examples. The results of measurement of various physical properties are shown in Tables 2 and 3.

COMPARATIVE EXAMPLE 2

Using the electrically conductive resin composition only, a single layer sheet was extruded by a single extruder. The product was inferior in the impact strength and the heat deformation temperature as comapred with the preceding Examples. The results of measurement of various physical properties are shown in Tables 2 and 3.

COMPARATIVE EXAMPLE 3

Using a styrene type electrically conductive sheet Thermosheet EC (manufactured by Denki Kagaku Kogyo K.K.), carrier tapes were prepared in the same manner. The tapes were inferior in the tensile strength and heat deformation temperature as compared with the preceding Examples. The results of measurement of various physical properties are shown in Tables 2 and 3.

TABLE 1

| Starting materials | Example 1 | | Example 2 | | Example 3 | |
|---|---|---|---|---|---|---|
| | Base material layer | Electrically conductive layer | Base material layer | Electrically conductive layer | Base material layer | Electrically conductive layer |
| Polyphenylene ether resin | 67.0 | 32.0 | 67.0 | 32.0 | 67.0 | 32.0 |
| High-impact polystyrene resin | 29.0 | 48.0 | 25.6 | 48.0 | 20.0 | 32.0 |
| Transparent polystyrene resin | — | — | — | — | 9.0 | 16.0 |
| Carbon black | — | 20.0 | 2.0 | 20.0 | — | 20.0 |
| Ethylene-ethyl acrylate copolymer resin | 4.0 | 7.4 | 7.4 | 7.4 | 4.0 | 7.4 |
| Processing assistant A | 1.20 | 1.20 | 1.20 | 1.20 | 1.20 | 1.20 |
| Processing assistant B | 1.20 | 1.20 | 1.20 | 1.20 | 1.20 | 1.20 |
| Processing assistant C | — | 1.80 | 1.80 | 1.80 | — | 1.80 |

| Starting materials | Example 4 | | Comparative Example 1 | | Comparative Example 2 |
|---|---|---|---|---|---|
| | Base material layer | Electrically conductive layer | Base material layer | Electrically conductive layer | |
| Polyphenylene ether resin | 58.0 | 40.0 | 67.0 | 32.0 | 40.0 |
| High-impact polystyrene resin | 38.0 | 40.0 | — | — | 40.0 |
| Transparent polystyrene resin | — | — | 29.0 | 48.0 | — |
| Carbon black | — | 20.0 | — | 20.0 | 20.0 |
| Ethylene-ethyl acrylate copolymer resin | 4.0 | 7.4 | 4.0 | 7.4 | 7.4 |
| Processing assistant A | 1.20 | 1.20 | 1.20 | 1.20 | 1.20 |
| Processing assistant B | 1.20 | 1.20 | 1.20 | 1.20 | 1.20 |
| Processing assistant C | — | 1.80 | — | 1.80 | 1.80 |

Unit: kg

TABLE 2

| | Physical properties of sheets | | | | | | | |
|---|---|---|---|---|---|---|---|---|
| | Thickness of the electrically conductive layer (%) | Precision of thickness of the electrically conductive layer (%) | Surface resistivity ($\Omega$) | Tensile properties | | | | Impact strength |
| | | | | Elongation at breakage (%) | Tensile strength at breakage (kgf/mm$^2$) | Tensile strength at yield point (kgf/mm$^2$) | Tensile modulus of elasticity (kgf/mm$^2$) | |
| Example 1 | 15 | $\leq$9% | $10^3$–$10^5$ | 39/20 | 5.4/5.1 | 5.4/5.0 | 190/180 | 0.81 |
| Example 2 | 30 | $\leq$9% | $10^3$–$10^5$ | 32/28 | 5.1/5.0 | 5.0/5.0 | 200/180 | 0.78 |
| Example 3 | 20 | $\leq$9% | $10^3$–$10^5$ | 31/25 | 5.1/4.9 | 5.3/5.1 | 190/190 | 0.75 |
| Example 4 | 50 | $\leq$9% | $10^3$–$10^5$ | 30/25 | 5.0/4.8 | 5.1/5.0 | 190/180 | 0.65 |
| Comparative Example 1 | 15 | $\leq$9% | $10^3$–$10^5$ | 9.5/9.0 | 5.1/4.9 | 5.2/5.0 | 190/190 | <0.3 |
| Comparative Example 2 | — | — | $10^3$–$10^5$ | 9.0/8.4 | 4.8/4.9 | 4.9/4.5 | 210/210 | 0.41 |
| Comparative Example 3 | — | — | $10^3$–$10^5$ | 43/36 | 2.5/2.2 | 2.7/2.5 | 150/140 | 0.63 |

TABLE 3

| | Physical properties of carrier tapes | | |
|---|---|---|---|
| | Emboss moldability | Surface resistivity ($\Omega$) | Deformation temp. (°C.) |
| Example 1 | Good | $10^5$–$10^8$ | >140 |
| Example 2 | Good | $10^5$–$10^8$ | >140 |
| Example 3 | Good | $10^5$–$10^8$ | >140 |
| Example 4 | Good | $10^5$–$10^8$ | >135 |
| Comparative Example 1 | Good | $10^5$–$10^8$ | >140 |
| Comparative Example 2 | Good | $10^5$–$10^8$ | >130 |
| Comparative Example 3 | Good | $10^5$–$10^8$ | <100 |

(1) Manufacturers and commercial names of the starting materials used

① Polyphenylene ether resin: Mitsubishi Gas Chemical Company, Inc., YPX-100L

② High impact polystyrene resin: Denki Kagaku Kogyo K.K., Denka Styrol HI-RQB

③ Transparent polystyrene resin: Denki Kagaku Kogyo K.K., Denka Styrol GP-1B

④ Electrical conductivity-imparting material: Denki Kagaku Kogyo K.K., Denka black particles ⑤ Modifier: ethylene-ethyl acrylate copolymer resin: Nihon Unika K.K., NUC-6169

⑥ Processing assistant A: Japan Ciba Geigy K.K., Irganox-245

⑦ Processing assistant B: Asahi Denka Kogyo K.K., PEB-36

⑧ Processing assistant C: Hoechst Japan K.K., VP-ET-132

(2) Methods for measuring the physical properties

The physical properties shown in Tables 2 and 3 were measured by the following methods.

① Thickness of electrically conductive layer (%)

During the sheet-forming operation, the ejected amounts of the resins were measured by the number of rotations of the extruders for the base material layer and the electrically conductive layer, and each thickness was calculated from the ratio of the ejected amounts.

② Precision of thickness of the electrically conductive layer

Using a wide stand microscope (manufactured by Peak Company), the thickness of each layer in the cross section of the sheet was measured at every distance of 20 mm in the width direction, and the precision was represented by the ratio of the largest difference between the average value and the maximum or minimum value to the overall thickness.

③ Surface resistivity

The surface resistivity was measured at a total of 40 points i.e. 10 points at every equal distance in the width direction of the sheet and two rows on each side by means of Rorester MCP-tester (manufactured by Mitsubishi Petrochemical Company Ltd., and a logarithmic means was taken as the surface resistivity.

④ Tensile properties

In accordance with JIS K-6732, the tensile test was carried out at a tensile speed of 10 mm/min by instron.

⑤ Impact strength

Using a Dupont impact tester, manufactured by Toyo Seiki K.K., a weight of 300 g, 500 g or 1 kg was dropped to obtain a 50% breakage height, and the energy value was calculated from the weight at that time. The calculation was carried out in accordance with JIS K-7211.

⑥ Emboss moldability

A sheet was slit into tapes with a width of 24 mm, which were subjected to embossing treatment by vacuum forming to form embosses having a length of 13 mm, a width of 19 mm and a depth of 3 mm. The one with rapture at the molded portions was identified with poor, and the one successfully molded without rapture was identified with good.

⑦ Surface resistance of carrier tapes

With respect to seven pockets, the surface resistivity was measured by connecting electrodes to the center of the bottom portion and the flange portion of each pocket by means of Rorester MCP tester (manufactured by Mitsubishi Petrochemical Company Ltd.), and a logarithmic mean was taken as the surface resistivity.

⑧ Heat deformation temperature

When an embossed tape is heated for 24 hours, the temperature at which a dimensional change of at least 1% occurs at the mouth portion or in the depth of pockets, was taken as the heat deformation temperature.

As described in the foregoing, the heat resistant electrically conductive carrier tape obtained by applying embossing treatment by vacuum forming, air-pressure forming or hot plate forming to a composite plastic sheet which comprises a base material layer made of a polyphenylene ether resin composition comprising three components of a polyphenylene ether resin, a high impact polystyrene resin and a polyolefin resin and an electrically conductive layer comprising three components of a polyphenylene ether resin, a high impact polystyrene resin and an electrical conductivity-imparting material, integrally laminated on one side or both sides of the base material layer by coextrusion, is useful as a packaging container for IC or electronic parts at the time of heat drying treatment.

What is claimed is:

1. A heat resistant electrically conductive plastic sheet comprising (1) a base material layer A made of a base material resin composition comprising from 32 to 94 wt % of a polyphenylene ether resin (hereinafter referred to simply as PPE), from 4 to 61 wt % of a high-impact polystyrene resin (hereinafter referred to simply as HI) and from 2 to 17 wt % of a polyolefin resin (hereinafter referred to simply as PO) and (2) an electrically conductive layer B made of an electrically conductive resin composition comprising from 10 to 85 wt % of PPE, from 8 to 82 wt % of HI and from 3 to 33 wt % of an electrical conductivity-imparting material, integrally laminated on one side or both sides of the base material layer A by coextrusion.

2. The heat resistant electrically conductive plastic sheet according to claim 1, wherein $a-40 \leq b \leq a-5$ where a is the content by weight % of PPE in the base material layer, and b is the content by weight % of PPE in the electrically conductive layer B on one side or both sides of the base material layer A.

3. The heat resistant electrically conductive plastic sheet according to claim 1, wherein the base material layer A contains from 0.1 to 10 parts by weight of a filler, per 100 parts by weight of the total amount of the three components of PPE, HI and PO.

4. The heat resistant electrically conductive plastic sheet according to claim 1, wherein the polyolefin resin is a polyethylene copolymer resin.

5. The heat resistant electrically conductive plastic sheet according to claim 1, wherein the electrical conductivity-imparting material is carbon black.

6. The heat resistant electrically conductive plastic sheet according to claim 1, wherein the overall thickness of the plastic sheet is from 0.1 to 5.0 mm, and the thickness of the electrically conductive layer B is from 2 to 70% of the overall thickness of the plastic sheet.

7. The heat resistant electrically conductive plastic sheet according to claim 1, wherein the surface resistivity of the electrically conductive layer B is at most $10^{10}$ Ω.

8. A packaging container for a semiconductor integrated circuit, prepared by thermoforming the plastic sheet as defined in claim 1.

9. The heat resistant electrically conductive plastic sheet according to claim 3, wherein the filler is carbon black.

10. The heat resistant electrically conductive plastic sheet according to claim 4, wherein the polyethylene copolymer resin is an ethylene-α-olefin copolymer resin and/or an ethylene-organic acid ester copolymer resin.

11. The heat resistant electrically conductive plastic sheet according to claim 5, wherein the carbon black has a carbon purity of at least 98% and a volatile content of at most 1.5%.

12. The packaging container for a semiconductor integrated circuit according to claim 8, which is a carrier tape.

13. The heat resistant electrically conductive plastic sheet according to claim 10, wherein the ethylene-α-olefin copolymer resin is an ethylene-1-butene copolymer resin.

14. The heat resistant electrically conductive plastic sheet according to claim 10, wherein the ethylene-organic acid ester copolymer resin is an ethylene-vinyl acetate copolymer resin and/or an ethylene-acrylic acid ester copolymer resin.

* * * * *

UNITED STATES PATENT AND TRADEMARK OFFICE
Certificate

Patent No. 5,415,906                                          Patented: May 16, 1995

On petition requesting issuance of a certificate for correction of inventorship pursuant to 35 U.S.C. § 256, it has been found that the above-identified patent, through error and without any deceptive intent, improperly sets forth the inventorship.

Accordingly, it is hereby certified that the correct inventorship of this patent is: Takeshi Miyakawa and Mikio Shimizu.

Signed and Sealed this Twenty-ninth Day of April, 1997.

JOHN C. BLEUTGE
*Supervisory Patent Examiner*
Art Unit 1501